July 29, 1930.  F. W. DELANOY ET AL  1,771,747
LIQUID DISPENSING APPARATUS
Filed Nov. 12, 1926   2 Sheets-Sheet 1
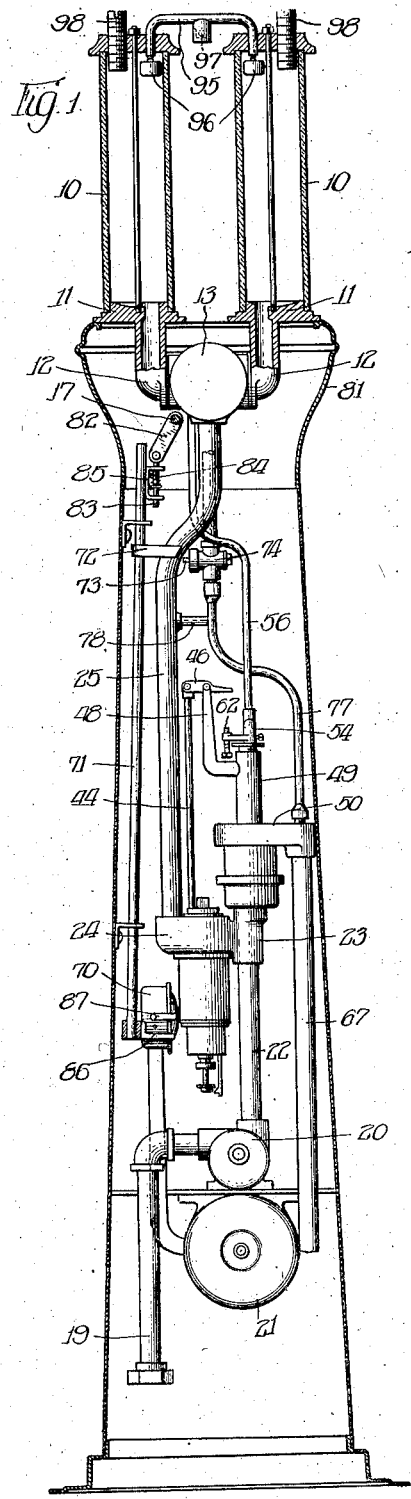
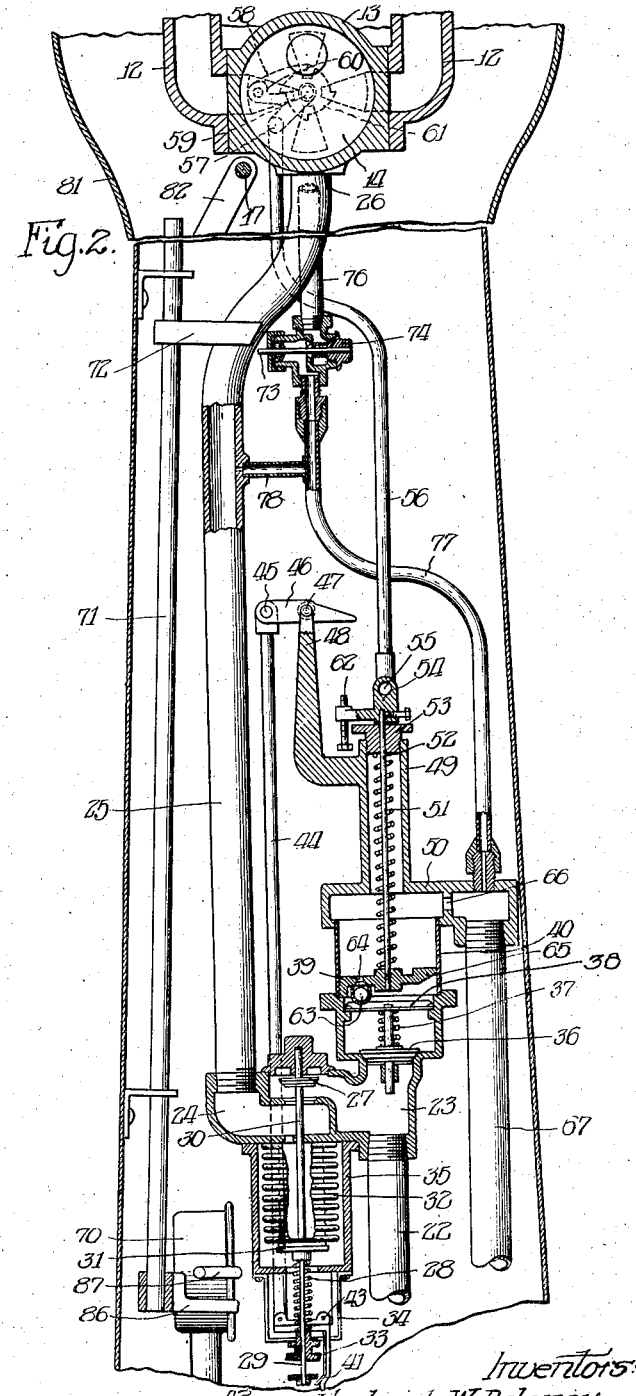
Inventors:
Frederich W Delanoy
Leo Deutsch
By Wilkinson, Huxley, Byron & Knight
Attys

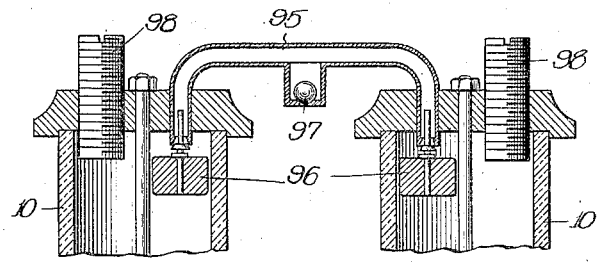
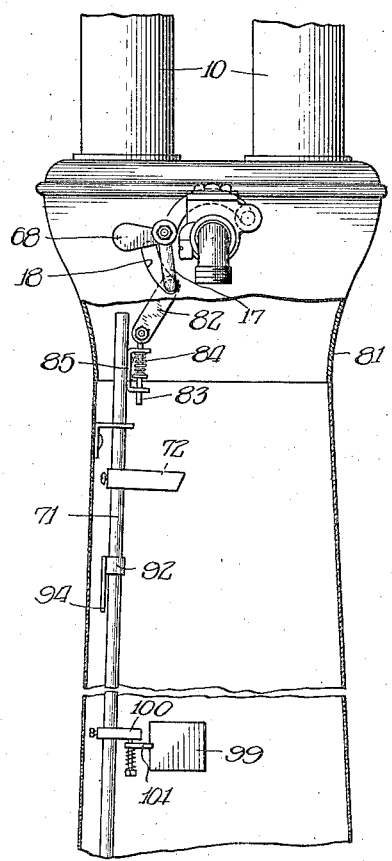
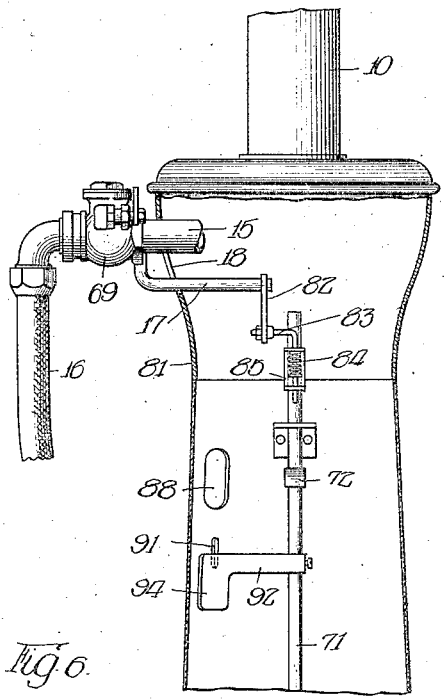
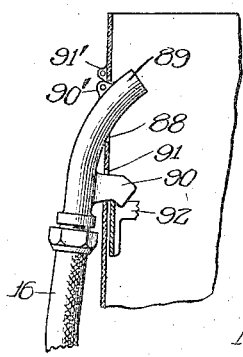

Patented July 29, 1930

1,771,747

UNITED STATES PATENT OFFICE

FREDERICK W. DELANOY AND LEO DEUTSCH, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

LIQUID-DISPENSING APPARATUS

Application filed November 12, 1926. Serial No. 147,942.

This invention relates to liquid dispensing apparatus.

One object of the invention is to provide simple, reliable and efficient liquid dispensing apparatus of the twin cylinder measuring type in which liquid may be quickly and accurately measured and dispensed.

Another object is to automatically time and control the operation of the various parts to minimize the time for supplying, accurately measuring and dispensing liquid.

Another object is to provide automatically operated liquid dispensing apparatus which is fool and cheat proof, and in which the various parts cooperate in a new and improved manner to meet all of the requirements.

With these and various other objects in view, the invention consists of certain novel features of construction and operation as will be more fully described and pointed out in the specification, drawings and claims appended hereto.

In the drawings, wherein like reference characters are used to designate like parts—

Figure 1 is a front elevational view, parts being broken away and some in section, of liquid dispensing apparatus embodying our invention;

Figure 2 is an enlarged fragmentary vertical sectional elevation of the same apparatus;

Figure 3 is an enlarged detail sectional view showing the air connection between the measuring chambers;

Figure 4 is an enlarged fragmentary view showing in front elevation the discharge valve mechanism and connections to other control parts;

Figure 5 is a side view of the parts shown in Figure 4, and

Figure 6 is a detail view showing means for hanging and protecting the discharge nozzle.

Referring to the figures of the drawings, it will be noted that our invention is illustrated in connection with liquid dispensing apparatus in which there are two similar or twin cylinders or chambers 10, preferably of glass, in which liquid to be dispensed is measured, it being understood that as liquid is supplied to one measuring chamber 10, liquid is discharged from the other measuring chamber for minimizing the time required to supply liquid to a customer. Preferably each of the twin chambers has a one gallon capacity but it will be appreciated that measuring chambers of different capacity may be employed if desired. These measuring chambers preferably are mounted upon base members 11 formed at the upper ends of conduits 12 connecting the lower ends of the measuring chambers 10 with the usual ported casing 13 of a four-way valve including a rotary valve member 14 for controlling the flow of liquid to and from said measuring chambers 10. Liquid to be measured is supplied to said measuring chambers 10 from any suitable source of supply indicated by the reference character 19, and forced by a pump 20, preferably operated by the motor 21, through a pipe 22, through valve chambers 23 and 24 and pipe 25 connected at 26 to the lower end of valve casing 13 in which the supply of liquid to and discharge of liquid from said measuring chambers 10 is controlled. The passage of liquid up through pipe 25 is controlled by a valve 27 which is moved to an open position by a spring 28 coiled around a lower stem 29 directly connected to the upper stem 30 of the valve 27, the spring being interposed between a base plate 31 of a bellows or sylphon tube 32 and the upper end of a hollow bolt 33, the latter of which is mounted in a bracket 34 suspended from a protecting casing 35 of the bellows 32. The valve 27 will remain in open position so long as pressure of liquid in the bellows 32 is not sufficient to expand the bellows and close the valve 27. However, sufficiently high liquid pressure is developed in said bellows 32 immediately after either one or the other of the measuring chambers 10 is filled. As soon as one of the measuring chambers 10 is filled, it being understood that pump 20 continues in operation, a back liquid presure is developed causing some of the excess pumped liquid to expand the bellows 32 for closing the valve 27, thereby cutting off communication between the supply pump 20 and the measuring chamber 10 which has just been filled.

As soon as the valve 27 is closed, it is locked in closed position by a pivotally mounted latch 41 which snaps into engagement with the upper end of a collar 42 secured to the lower end of stem 29. The latch 41 is pivotally mounted in the bracket 34 at 43 and is operatively connected to a rod 44 in turn pivotally connected at 45 to a latch lever 46 pivotally connected at 47 to a bracket 48 formed on a hollow extension 49 of a cylinder head 50. The valve 27 is thus locked in closed position for an important purpose which will be appreciated more fully from description to be referred to hereinafter.

As the pump 20 continues to supply liquid, an increased pressure is developed in valve chamber 23 resulting in the opening of a valve 36 which normally is held closed by a coiled spring 37 extending between said valve 36 and a spider structure 38. As soon as the valve 36 is moved upwardly into an open position, liquid pressure is exerted against a piston 39 mounted in a cylinder 40, resulting in an upward movement of said piston 39 against the tension of a spring 51 coiled around a piston rod 52 which is slidable through a hollow stud 53, closing the upper end of cylinder head extension 49. Said piston rod 52 is connected to a bracket 54 which in turn is pivotally connected at 55 to one end of a connecting rod 56, the other end of which is pivotally connected at 57 to the bracket of a pawl 58 pivotally supported on the valve shaft 59, the pawl successively engageable with the four teeth 60 of a ratchet wheel 61 secured to the valve shaft 59 for rotating the valve 14 through 90° steps for controlling the alternate filling and discharging of the measuring chambers 10. It will be understood, therefore, that as the piston 39 rises as a result of liquid pressure thereunder, the rotary valve 14 is given a movement through an angle of 90° for reversing the filling and discharging connections to the measuring chambers 10.

It will be appreciated that as soon as the rotary valve 14 is moved to uncover a port through which liquid may be discharged from the cylinder just filled, that pressure will be reduced in the pipe 25 and bellows 32, which would result in a premature opening of valve 27 were it not for the fact that said valve is locked in closed position by the latch 41. If the valve 27 were permitted to open before the piston 39 had been completely raised to rotate the control valve 14 through an angle of 90°, said rotary valve 14 would become stalled in a mid position resulting in a failure of the proper operation of the apparatus. In other words, it is necessary that the rotary valve 14 be rotated through 90° for properly and completely reversing the filling and discharging connections to and from the measuring chambers 10. Accordingly, means is provided whereby the latch 41 does not release the valve 27 until the valve 14 is moved through an angle of 90° for completely reversing the filling and discharging connections for said measuring chambers 10. In connection with moving the latch 41 for releasing the valve 27, it will be noted that a stud 62 is adjustable in and extends through an arm of bracket 54 which moves upwardly with the piston 39. The stud 62 is positioned so that it will move into engagement with and move the latch lever 46 just as the rotary valve 14 is completely reversed, resulting in a downward movement of rod 44 and an outward swinging movement of the latch 41 for releasing the collar 42, whereupon the valve 27, under the influence of spring 28, moves upwardly into an open position. At this time pressure in the system is relieved except for the head of the liquid in the pipe 25, making it possible for the spring 37 to move the valve 36 into closed position and the spring 51 to move the piston 39 into its lower position, it being understood that as soon as pressure is relieved under the piston 39, the pressure relief valve 63 falls into its cage for permitting liquid in the cylinder below the piston to pass through the associated port 64 to the upper side of the piston 39. In connection with the operation of the piston 39, any excess liquid which is pumped into the cylinder 40 after the piston 39 has reached its upper position will be discharged past the beveled portion 65 of the piston through an opening 66 in the cylinder head 50 and be discharged through the overflow pipe 67 which returns the liquid to the source of supply.

A discharge control valve operated by a handle 68 and mounted within a valve casing 69 is provided, said valve casing being connected through a pipe 15 to the discharge opening of the valve casing 13. The supply of liquid through the hose 16 to a customer is ultimately controlled by the movement of valve handle 68. If the discharge valve is closed, the apparatus cannot operate for the reason that the control handle 68 of the discharge valve is interlocked with the switch 70 for controlling the circuit of the motor 21 by interlocking parts including bar 71. Discharge control handle 68 has an extension arm 17 which extends through and is movable in an arcuate slot 18 in casing 81. Arm 17 is connected by link 82 to a rod 83 yieldably connected by a spring 84 to a bracket 85 connected to the upper end of rod 71. The lower end of rod 71 is provided with a finger 86 for engagement with controller handle 87 of switch 70. Accordingly, when the discharge control handle 68 is raised to a point sufficient to compress spring 84 in a valve-opening movement, the locking bar 71 will be raised for closing the circuit of the motor 21 at the switch 70. The closing of the switch 70 is so timed with the upward movement of valve handle 68 that the pump 20 is not set in operation until the discharge valve is wide open, thereby insuring a complete emptying of the discharging chamber 10 before liquid again can be supplied thereto; otherwise liquid might be supplied to the chamber as it is emptying, resulting in short measure to a customer.

The casing 81 has an opening 88 through which the discharge end of the nozzle 89 may extend to protect it against the weather. The nozzle has a hook 90 which may extend through a slot 91 in the casing 81 and be rested or hung upon a finger 92 secured to the rod 71 for locking the rod 71 in lowered position, the switch 70 thereby being maintained in open position and the discharge valve 69 in closed position. The nozzle 89 may be positively locked in its hung position by a lock passing through the hasps 90' and 91'. All parts of the pump will thereby be held in an inoperative condition. The hook 90 has a cam shaped end for automatically depressing the finger 92 when the nozzle hook is projected into the casing 81. It will be understood, of course, that when the discharge valve 68 is moved into closed position, the switch 70 is automatically opened for breaking the circuit of motor 21 and stopping the pump 20. The parts are then locked in such position by the nozzle 89 as described.

This same interlocking bar 71 is provided with an arm 72 having an inclined or cam shaped end adapted to pass into engagement with the stem 73 of a spring pressed bleeder valve 74 for opening the latter when the nozzle 89 is hung within the casing 81. When the bleeder valve 74 is thus opened, liquid is drained from the four-way valve casing 13 at the same point that the liquid is delivered to the hose so that when the nozzle 89 is hung on finger 92, liquid which is in the four-way valve casing or that which is undelivered in chamber 10 which is emptying, is drained from said casing 13, through a drain pipe 76, past valve 74 and through drain pipe 77 into overflow pipe 67. A bleeder connection 78 is also provided between the liquid supply pipe 25 and the drain pipe 77 whereby any liquid which may be in the other chamber 10 on the filling side may be drained back through the connection 78, pipe 77 and overflow pipe 67 to the storage tank. When the nozzle 89 is withdrawn from the casing 81, a broadened portion 94 of the finger 92 covers the slot 91.

An air connection 95 is provided between the upper ends of the measuring chambers 10 so that as one chamber is being filled with liquid, the air in said chamber may be transferred to the other chamber from which liquid is being emptied. In order to prevent a transfer of liquid from one chamber to the other through the air connection 95, float valves 96 are provided which are automatically closed by the rising liquid in said chambers. For permitting the draining off of the last gallon after the pump has stopped operating, a vacuum breaker 97 is provided in the air connection 95. It will be understood that in the continuous operation of the apparatus, there is only sufficient air present to displace the contents of one chamber. Accordingly, it is necessary to provide a like amount of air to the system when the last gallon is drawn off. For compensating for any inequalities in the measuring chambers 10, a calibrating plug 98 is provided in each chamber.

A meter 99, for example, may be provided for measuring liquid in a known manner as it discharges from the measuring chambers 10. To prevent actuation of the meter 99 when liquid is draining back from said measuring chambers when the nozzle is in hung position, the rod 71 is provided with another finger 100 for engaging a lever 101 for making the meter temporarily non-recording.

It is to be understood of course that we do not wish to be limited by the exact embodiments of the device shown, which are merely by way of illustration and not by way of limitation, as other and various forms of the device will of course be readily apparent to those skilled in the art.

We claim:

1. In liquid dispensing apparatus, the combination of a plurality of measuring chambers, means for supplying liquid thereto, control means for controlling the supply of liquid alternately to said chambers, and a bellows actuated valve for controlling the flow of liquid to said control means and measuring chambers, and for controlling the operation of said control means.

2. In liquid dispensing apparatus, the combination of a plurality of measuring chambers, means for supplying liquid thereto, control means for controlling the supply of liquid alternately to said chambers, a pressure actuated valve for controlling the operation of said control means, and means for holding said valve in a given position until said control means is moved into a predetermined position to permit liquid to flow into the measuring chamber which is empty.

3. In liquid dispensing apparatus, the combination of a plurality of measuring chambers, means for supplying liquid thereto, control means for controlling the supply of liquid alternately to said chambers, a pressure actuated valve for controlling the operation of said control means, and a latch for holding said valve in closed position until said control means is moved into a given position to permit liquid to flow into the measuring chamber which is empty.

4. In liquid dispensing apparatus, the combination of a plurality of measuring chambers, means for supplying liquid thereto, control means for controlling the supply of liquid alternately to said chambers, a pressure actuated valve for controlling the operation of said control means, means for holding said valve in closed position until said control means is moved into a given position to permit liquid to flow into the measuring chamber which is empty, and means for releasing said holding means when said control means is moved into said given position.

5. In liquid dispensing apparatus, the combination of a plurality of measuring chambers, means for supplying liquid thereto, control means for controlling the supply of liquid alternately to said chambers, a pressure actuated valve for controlling the operation of said control means, means for holding said valve in closed position until said control means is moved into a given position to permit liquid to flow into the measuring chamber which is empty, and fluid pressure actuated means for tripping said holding means when said control means is moved into said given position.

6. In liquid dispensing apparatus, the combination of a plurality of measuring chambers, means for supplying liquid thereto, control means for controlling the supply of liquid alternately to said chambers, a pressure actuated valve for controlling the operation of said control means, means for holding said valve in closed position until said control means is moved into a given position to permit liquid to flow into the measuring chamber which is empty, and means for successively operating said control means and said holding means whereby the latter is actuated only after said control means is moved into a predetermined position.

7. In liquid dispensing apparatus, the combination of a plurality of measuring chambers, means for supplying liquid thereto, control means for controlling the supply of liquid alternately to said chambers, a pressure actuated valve for controlling the operation of said control means, means for holding said valve in closed position until said control means is moved into a given position to permit liquid to flow into the measuring chamber which is empty, and a fluid actuated member for successively operating said control means and said holding means whereby the latter is actuated only after said control means is moved into a predetermined position.

8. In liquid dispensing apparatus, the combination of a plurality of measuring chambers, means for supplying liquid thereto, control means for controlling the supply of liquid alternately to said chambers, a pressure actuated valve for controlling the supply of fluid toward said control means, and pressure actuated means effective only after said valve has been closed for actuating said control means.

9. In liquid dispensing apparatus, the combination of a plurality of measuring chambers, means for supplying liquid thereto, control means for controlling the supply of liquid alternately to said chambers, a pressure actuated valve for controlling the supply of fluid toward said control means, pressure actuated means effective only after said valve has been closed for actuating said control means, and means for holding said valve in closed position until said control means is moved into a predetermined position to permit liquid to flow into the empty chamber.

10. In liquid dispensing apparatus, the combination of a plurality of measuring chambers, means for supplying liquid thereto, control means for controlling the supply of liquid alternately to said chambers, a pressure actuated valve for controlling the supply of fluid toward said control means, pressure actuated means effective only after said valve has been closed for actuating said control means, means for holding said valve in closed position until said control means is moved into a predetermined position to permit liquid to flow into the empty chamber, and means for thereafter releasing said pressure actuated valve.

11. In liquid dispensing apparatus, the combination of a plurality of measuring chambers, means for supplying liquid thereto, a valve for controlling the supply of liquid alternately to said chambers, a second valve for controlling the supply of liquid toward said first mentioned valve, and means for holding said second mentioned valve in a position to prevent flow of liquid toward said first mentioned valve after one of said chambers has been filled until said first mentioned valve has been moved into a position to permit liquid to flow into the other one of said measuring chambers.

12. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, and means for locking said valve closed until said control means is moved into a position to permit said other measuring chamber to be filled.

13. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, means for locking said valve closed until said control means is moved into a position to permit said other measuring chamber to be filled, and means for releasing said valve after said control means has been moved into such predetermined position.

14. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, means for locking said valve closed until said control means is moved into a position to permit said other measuring chamber to be filled, and a fluid actuated piston for operating said control means after one of said chambers has been filled.

15. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, means for locking said valve closed until said control means is moved into a position to permit said other measuring chamber to be filled, a fluid actuated piston for operating said control means after one of said chambers has been filled, and means for releasing said valve to permit filling the second measuring chamber.

16. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, means for locking said valve closed until said control means is moved into a position to permit said other measuring chamber to be filled, a fluid actuated piston for operating said control means after one of said chambers has been filled, and a pressure actuated valve responsive only to a pressure greater than that required to close said first mentioned valve for permitting actuation of the fluid actuated means which actuates said control means.

17. In liquid dispensing apparatus, the combination of a plurality of measuring chambers, means for supplying liquid thereto, control means for controlling the supply of liquid alternately to said chambers, a pressure actuated valve in the supply line which under fluid pressure is closed when one of said measuring chambers is filled, means for locking said valve closed until said control means is moved into a position to permit said other measuring chamber to be filled, a fluid actuated piston for operating said control means after one of said chambers has been filled, a pressure actuated valve responsive only to a pressure greater than that required to close said first mentioned valve for permitting actuation of the fluid actuated means which actuates said control means, and means for releasing said first mentioned valve when said control means is moved into a predetermined position.

18. In liquid dispensing apparatus, the combination of a plurality of measuring chambers, means for supplying liquid thereto, control means for controlling the supply of liquid alternately to said chambers, and a plurality of successively actuated valves, one for shutting off the supply of liquid toward said control means and the other for actuating said control means to permit filling of the measuring chambers.

19. In liquid dispensing apparatus, the combination of a plurality of measuring chambers, means for supplying liquid thereto, control means for controlling the supply of liquid alternately to said chambers, a plurality of successively actuated valves, one for shutting off the supply of liquid toward said control means and the other for actuating said control means to permit filling of the measuring chambers, means for locking the first mentioned valve in closed position, and means for releasing said valve after said control means has been moved into a certain predetermined position.

20. In liquid dispensing apparatus, the combination of a plurality of measuring chambers, means for supplying liquid thereto, control means for controlling the supply of liquid alternately to said chambers, a pressure actuated valve for shutting off the supply of liquid after one of said chambers has been filled, means for locking said valve in closed position, and means for thereafter actuating said control means to permit filling of the second measuring chamber.

21. In liquid dispensing apparatus, the combination of a plurality of measuring chambers, means for supplying liquid thereto, control means for controlling the supply of liquid alternately to said chambers, a pressure actuated valve for shutting off the supply of liquid after one of said chambers has been filled, means for locking said valve in closed position, means for thereafter actuating said control means to permit filling of the second measuring chamber, and means for releasing the said valve after said control means has been moved into a position to permit filling of the second chamber.

22. In liquid dispensing apparatus, the combination of a plurality of measuring chambers, means for supplying liquid thereto, control means for controlling the supply of liquid alternately to said chambers, a pressure actuated valve for shutting off the supply of liquid to said measuring chambers after one of same has been filled, means for locking said valve in closed position, a fluid actuated member, and connections between said fluid actuated member and said control means, and between said fluid actuated member and said valve holding means whereby said control means is moved into a position to permit filling of the second measuring chamber and thereafter said holding means moved for releasing said valve.

23. In liquid dispensing apparatus, the combination of a plurality of measuring chambers, a supply connection to said chambers, a valve in said connection for controlling the supply of liquid to and discharge of liquid from said measuring chambers, a drain connection from the discharge side of said control means for draining liquid from the measuring chamber discharging when the apparatus is not in use, and a pipe connecting the supply connection to said drain connection for draining liquid from the measuring chamber being filled.

24. In liquid dispensing apparatus, the combination of a plurality of measuring chambers, means for supplying liquid thereto, control means for controlling the supply of liquid to said chambers, and pressure actuated means for controlling the flow of liquid to said control means and measuring chambers, and for controlling the operation of said control means.

25. In liquid dispensing apparatus, the combination of a plurality of measuring chambers, fluid pressure actuated means for controlling the supply of liquid to said chambers, and means for locking said fluid pressure actuated means in a given position after one of said chambers is filled.

26. In liquid dispensing apparatus, the combination of a plurality of measuring chambers, means for supplying liquid thereto, means for discharging liquid therefrom, and means for preventing the supply of liquid to said measuring chambers except when said means for discharging the liquid from one of said chambers is completely effective.

27. In liquid dispensing apparatus, the combination of a plurality of measuring chambers, means for supplying liquid thereto, means for controlling the discharge of liquid therefrom, and means for preventing the supply of liquid to said measuring chambers except when said discharge control means permits a full discharging action.

28. In liquid dispensing apparatus, the combination of a plurality of measuring chambers, means for supplying liquid thereto, a valve for controlling the supply of liquid to said measuring chambers, discharge control means, and means for preventing the supply of liquid to said measuring chambers except when said discharge control means permits a full discharging action.

29. In liquid dispensing apparatus, the combination of a plurality of measuring chambers, means for supplying liquid thereto, and means whereby said supply means does not supply liquid to one of said measuring chambers except when another measuring chamber is under full discharge.

30. In liquid dispensing apparatus, the combination of a plurality of measuring chambers, a motor for supplying liquid thereto, a discharge control valve for controlling the discharge of liquid from said chambers, and means whereby said motor is ineffective for supplying liquid to one of said measuring chambers except when said discharge valve is in full open position for permitting a discharge from another of said measuring chambers.

31. In liquid dispensing apparatus, the combination of a plurality of measuring chambers, means for supplying liquid thereto, a valve for controlling the discharge of liquid from said chambers, an electric motor for operating said supplying means, a switch for starting and stopping said motor, and means for preventing the closing of said switch and the starting of said motor until said discharge control valve is opened to full discharge position.

32. In liquid dispensing apparatus, the combination of a liquid measuring chamber, a supply pipe through which liquid may be supplied to said chamber, control means for controlling the supply of liquid to and the discharge of liquid from said chamber, a drain connection extending from the discharge side of said control means and having a drain valve, a motor for pumping liquid through said supply pipe, a separate discharge control valve, and means whereby when said discharge control valve is moved into closed position the motor is stopped and the drain valve opened.

33. In liquid dispensing apparatus, the combination of a liquid measuring chamber, a supply pipe through which liquid may be supplied to said chamber, control means for controlling the supply of liquid to and the discharge of liquid from said chamber, a drain connection extending from the discharge side of said control means and having a drain valve, a motor for pumping liquid through said supply pipe, a separate discharge control valve, means whereby when said discharge control valve is moved into closed position the motor is stopped and the drain valve opened, and a hose supporting member which when the hose is hung in place prevents operation of the motor and holds said drain valve open.

34. In liquid dispensing apparatus, the combination of a liquid measuring chamber, a motor by means of which liquid may be supplied to said chamber, a valve for controlling the discharge of liquid from said measuring chamber, a connection between said discharge control valve and motor whereby when said discharge control valve is in closed position the motor is ineffective to supply liquid to said chamber, and a hose supporting member which when the hose is hung in place acts as a lock to prevent supply of liquid to said chamber by said motor and locks said discharge control valve in closed position.

35. In liquid dispensing apparatus, the combination of a plurality of measuring chambers, a motor for supplying liquid thereto, and means whereby said motor does not supply liquid to one of said measuring chambers except when the other measuring chamber is under full discharge.

36. In a liquid dispensing apparatus, the combination of measuring chambers, a valve for alternately filling and discharging said chambers through the bottoms thereof, means for operating said valve to change filling and discharge operation to said chambers, said means including a reciprocating member and a member normally preventing operation of said reciprocating member.

37. In a liquid dispensing apparatus, the combination of measuring chambers, discharge means and supply means therefor, a valve between said means and chambers and connected thereto for directing liquid flow, reciprocating means for operating said valve to direct the liquid flow therethrough, fluid pressure sensitive means cooperating with said reciprocating means normally preventing operation of said valve, and lost motion means in said reciprocating means permitting operation of said valve by said reciprocating means when said pressure sensitive means is operated.

38. In a liquid dispensing apparatus, the combination of measuring chambers, discharge means and supply means therefor, a valve between said means and chambers and connected thereto for directing liquid flow to said chambers and discharge means, reciprocating means for operating said valve to direct the liquid flow to alternate chambers and from alternate chambers to said discharge means, fluid pressure sensitive means cooperating with said reciprocating means normally preventing movement of said reciprocating means to operate said valve, and lost motion means in said reciprocating means permitting operation of said valve by said reciprocating means when said pressure sensitive means is operated.

Signed at Rochester, Pennsylvania, this 1st day of November, 1926.

FREDERICK W. DELANOY.
LEO DEUTSCH.